(12) United States Patent
Nagano et al.

(10) Patent No.: US 6,331,886 B2
(45) Date of Patent: *Dec. 18, 2001

(54) IMAGE READING APPARATUS

(75) Inventors: Masatoshi Nagano, Tokyo; Toshimi Iizuka, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,364

(22) Filed: Feb. 4, 1999

(30) Foreign Application Priority Data

Feb. 9, 1998 (JP) .................................................. 10-027185
Mar. 18, 1998 (JP) .................................................. 10-068537

(51) Int. Cl.$^7$ ..................................................... G03B 27/62
(52) U.S. Cl. ............................................. 355/75; 353/26 R
(58) Field of Search ................................. 355/27, 40, 41, 355/75; 348/96, 97, 102; 358/474, 487, 506, 302, 501; 353/26 R, DIG. 2; 396/567, 322; 206/225, 232, 455, 408, 450

(56) References Cited

U.S. PATENT DOCUMENTS

| | | | |
|---|---|---|---|
| 5,546,122 | * 8/1996 | Asami et al. | 348/96 |
| 5,576,836 | * 11/1996 | Sano | 358/301 |
| 5,754,314 | * 5/1998 | Araki et al. | 358/487 |
| 5,973,729 | * 10/1999 | Washizu | 348/96 |
| 5,995,204 | * 11/1999 | Hoshino et al. | 355/75 |

* cited by examiner

*Primary Examiner*—Safet Metjahic
*Assistant Examiner*—Etienne P LeRoux
(74) *Attorney, Agent, or Firm*—Robin, Blecker & Daley

(57) ABSTRACT

An image reading apparatus is constructed so that a film holder and an adapter that are accessories can be selectively mounted to a film scanner that serves as an original placing board. A cartridge containing a dedicated film can be inserted into and removed from the adapter. Image information is read from the film in the film holder or the film in the cartridge by moving the original placing board. Further, the film or the cartridge can be exchanged in a condition where the film holder or the adapter is mounted to the film scanner.

11 Claims, 20 Drawing Sheets

IMAGE READING APPARATUS

BACKGROUND OF THE INVENTION

1. Field of the Invention

The present invention relates to an image reading apparatus for reading an image recorded on a film original such as a developed photographic film.

2. Description of Related Art

The structure of a conventional film scanner serving as an image reading apparatus will be described with reference to FIGS. 20 through 24.

FIG. 20 is a perspective view showing the structure of the conventional film scanner. FIG. 21 is a block diagram showing the schematic structure of the film scanner shown in FIG. 20. Furthermore, FIG. 22 is a block diagram showing the circuit structure of the film scanner shown in FIG. 20.

Referring to FIGS. 20 and 21, a developed film 102 is fixed on a film carriage 101 which is used as an original placing board. Light emitted from a lamp 103 which is a light source passes through the film 102 and is then reflected by a mirror 104 to be imaged by a lens 105 on a line sensor 106 which is composed of a CCD.

A motor 107 moves the film carriage 101 in scanning directions (directions of arrows in FIGS. 20 and 21), and a sensor 108 detects the position of the film carriage 101. Reference numeral 109 denotes an optical axis directed from the lamp 103 to the line sensor 106, reference numeral 110 denotes a control circuit, and reference numeral 111 denotes a lens holder arranged to hold the lens 105. Reference numeral 112 denotes an exterior case of the film scanner, and reference numeral 113 denotes an input and output terminal.

The lamp 103, line sensor 106, motor 107, sensor 108, and the input and output terminal 113 are electrically connected to the control circuit 110. Further, the control circuit 110, as shown in FIG. 22, is composed of a film scanner control circuit 110-1, a sensor control circuit 110-2, a motor control circuit 110-3, an image information processing circuit 110-4, a lamp control circuit 110-5, a line sensor control circuit 110-6, a quantity-of-light detecting circuit 110-7, and a motor-driving-speed deciding circuit 110-8.

Next, the method of reading image information recorded on the film 102 will be described.

First, when a film reading command is inputted from the external through the input and output terminal 113, the position of the film carriage 101 is detected by the sensor 108 and sensor control circuit 110-2. This position information is transmitted to the film scanner control circuit 110-1. Then, in order to make the film carriage 101 stand ready at a predetermined standby position, the motor 107 is driven by the motor control circuit 110-3, and hence the film carriage 101 is moved to the standby position. Furthermore, the lamp control circuit 110-5 turns on the lamp 103, and rough scanning is performed by rotating the motor 107 at a predetermined speed by the motor control circuit 110-3 so as to scan an image area of the film 102 at a predetermined speed in the direction of a film plane. During this rough scanning, image information is transmitted to the line sensor control circuit 110-6 by the line sensor 106.

Next, the film carriage 101 is moved to the predetermined standby position by rotating the motor 107. Then, fine scanning is performed by rotating the motor 107. During this fine scanning, image information is transmitted from the line sensor 106 to the image information processing circuit 110-4 through the line sensor control circuit 110-6. When the fine scanning is completed, the lamp control circuit 110-5 turns off the lamp 103, and at the same time, the image information processing circuit 110-4 performs image information processing. Moreover, the image information is outputted from the input and output terminal 113, and the operation of the film scanner is terminated.

Since the above conventional film scanner is adapted to read only a specific kind of transparent original (developed photographic film), it is not possible to read a different kind of transparent original such as a transparent original contained in a dedicated cartridge.

In addition, since a loading slot for inserting a strip film holder or a slide-mounted film is always opened in the above conventional film scanner, there is a possibility of dust entering from the loading slot. The dust entering inside the film scanner adheres to a surface of the lamp, which is an internal light source, and to optical parts such as a mirror, and hence leads to nonuniformity of the light source and reduction of luminous intensity. As a result, there happens a problem of decreasing the quality of a read image.

BRIEF SUMMARY OF THE INVENTION

An object of the present invention is to provide an image reading apparatus which has excellent operability. In addition, another object of the present invention is to prevent invasion of foreign particles and dust, which leads to reduction of image quality and a failure, into the inside of the image reading apparatus.

To attain the above objects, in accordance with an aspect of the present invention, there is provided an image reading apparatus, which comprises a mounting portion for mounting thereto a holder which holds a film original, and image reading means for reading image information recorded on the film original, wherein the film original is able to be loaded in and/or unloaded from the holder in a condition where the holder is mounted to the mounting portion. Owing to this construction, it becomes possible to increase the operability of the image reading apparatus.

In accordance with another aspect of the present invention, there is provided an image reading apparatus, which comprises a loading slot for inserting therein a film original, transport means for transporting the film original for reciprocating motion from the loading slot toward an inner side of the image reading apparatus, and a lid for covering the loading slot. Owing to this construction, it becomes possible to prevent the invasion of foreign particles and dust into the inside of the image reading apparatus.

The above and further objects, features, and advantages of the present invention will become apparent from the following detailed description of preferred embodiments thereof taken in conjunction with the accompanying drawings.

DETAILED DESCRIPTION OF THE INVENTION

Hereinafter, preferred embodiments of the present invention will be described in detail with reference to the drawings.

(First Embodiment)

A film scanner according to a first embodiment of the present invention will be described with reference to FIGS. 1 through 7.

Figure 1:
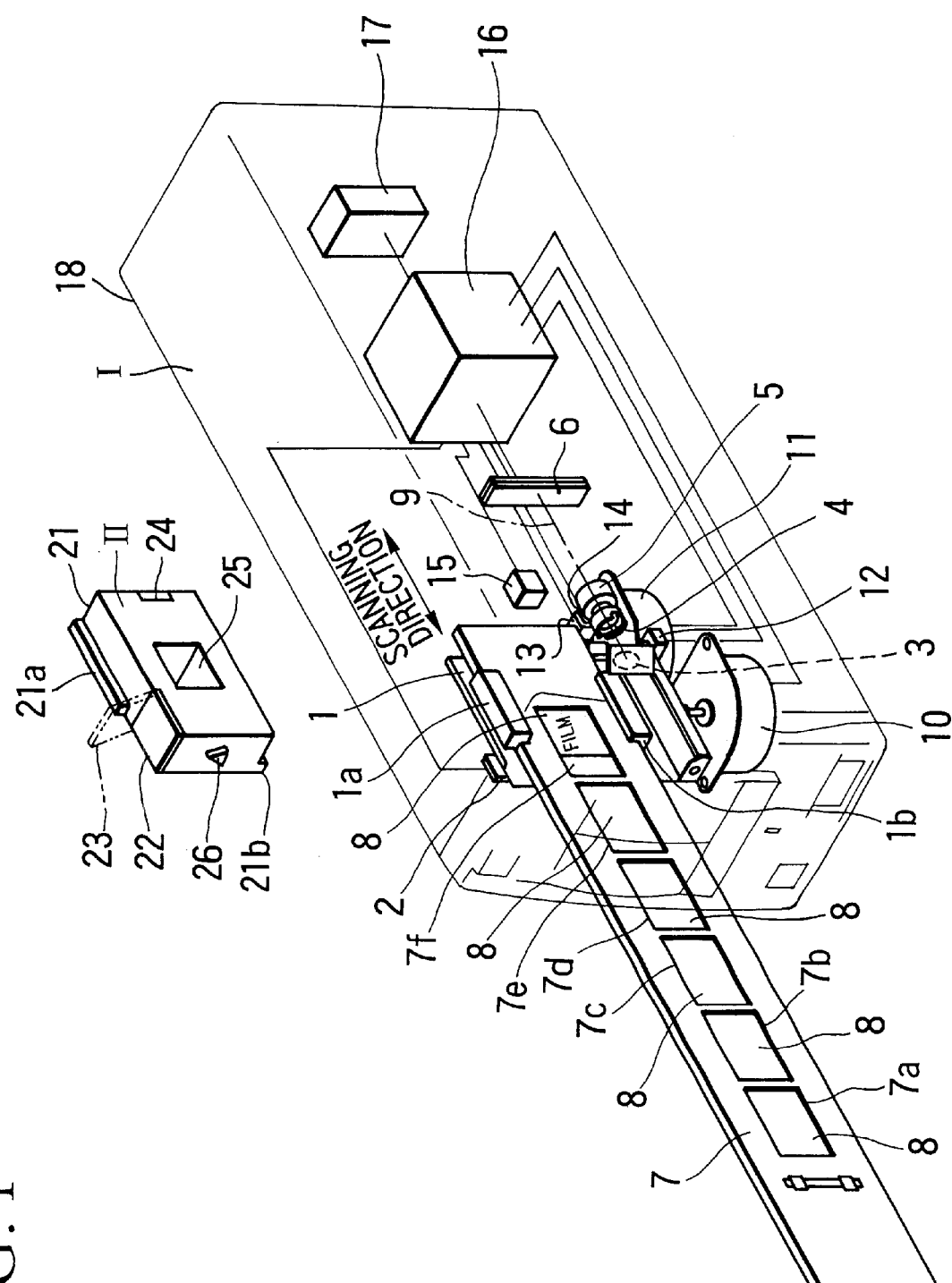
FIG. 1 is a perspective view of a film scanner according to a first embodiment of the present invention.
Figure 2:
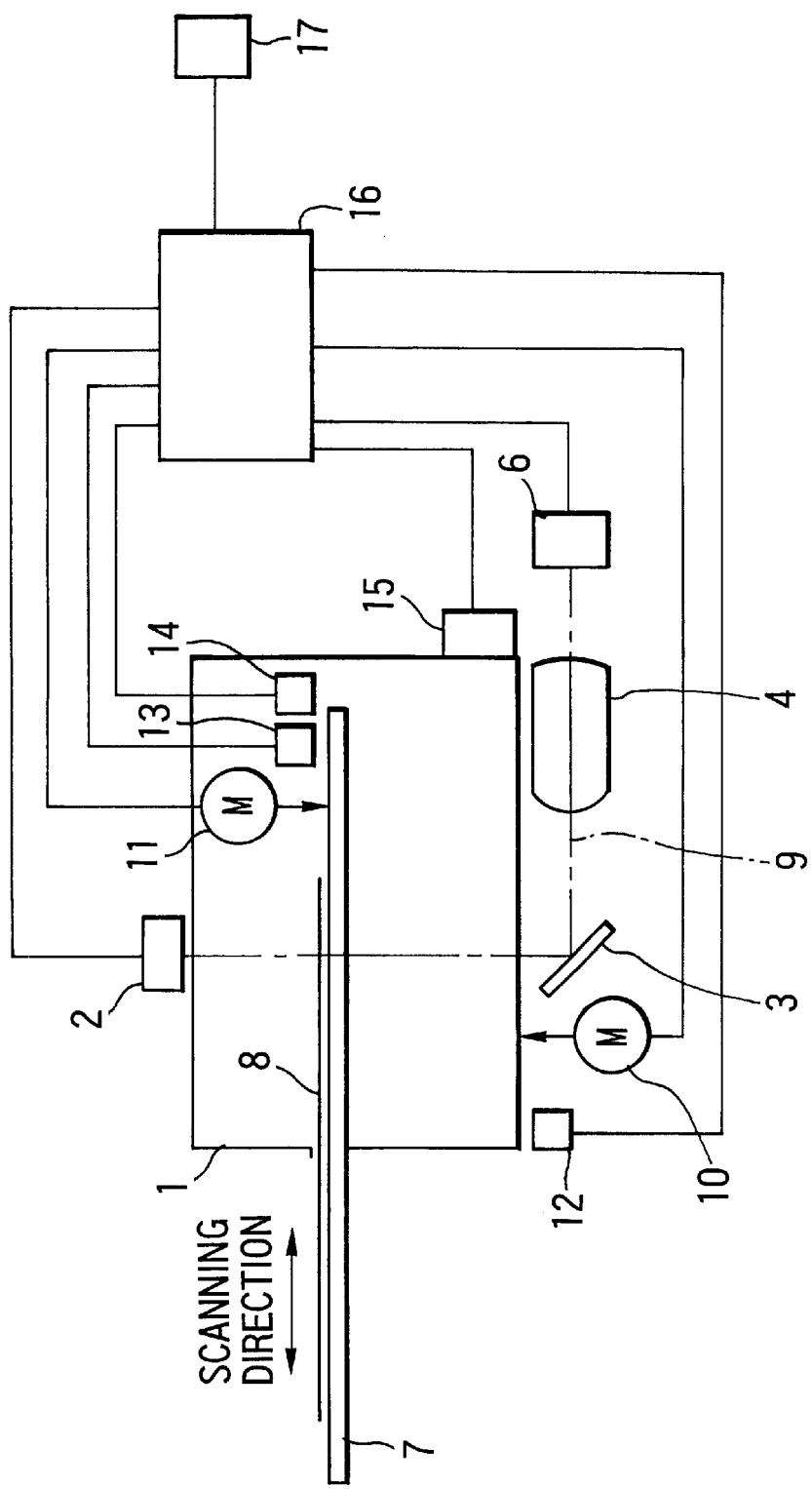
FIG. 2 is a diagram showing a schematic construction of the film scanner according to the first embodiment with a film holder being mounted thereto.
Figure 3:
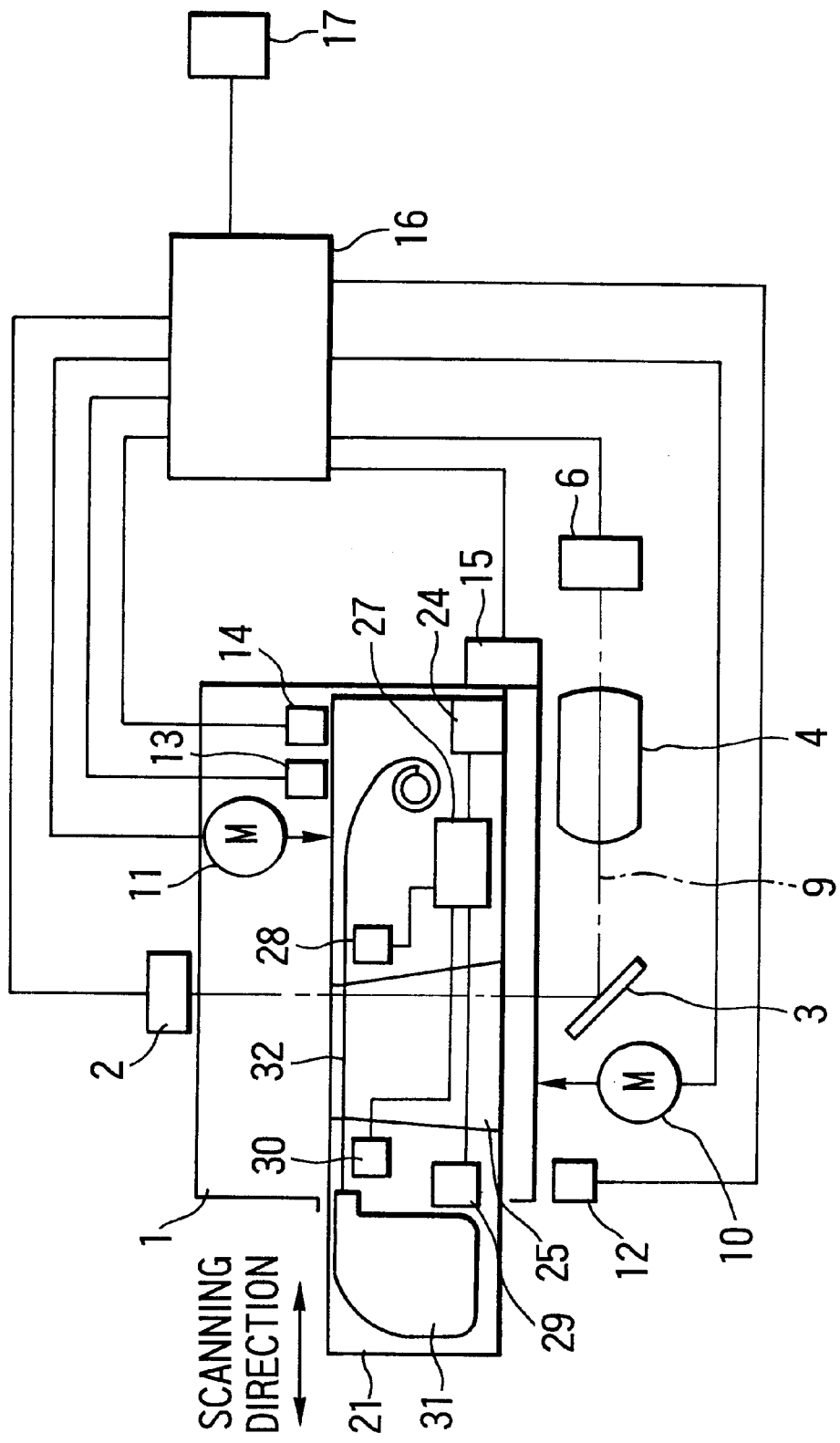
FIG. 3 is a diagram showing a schematic construction of the film scanner according to the first embodiment with an adapter being mounted thereto.
Figure 4:
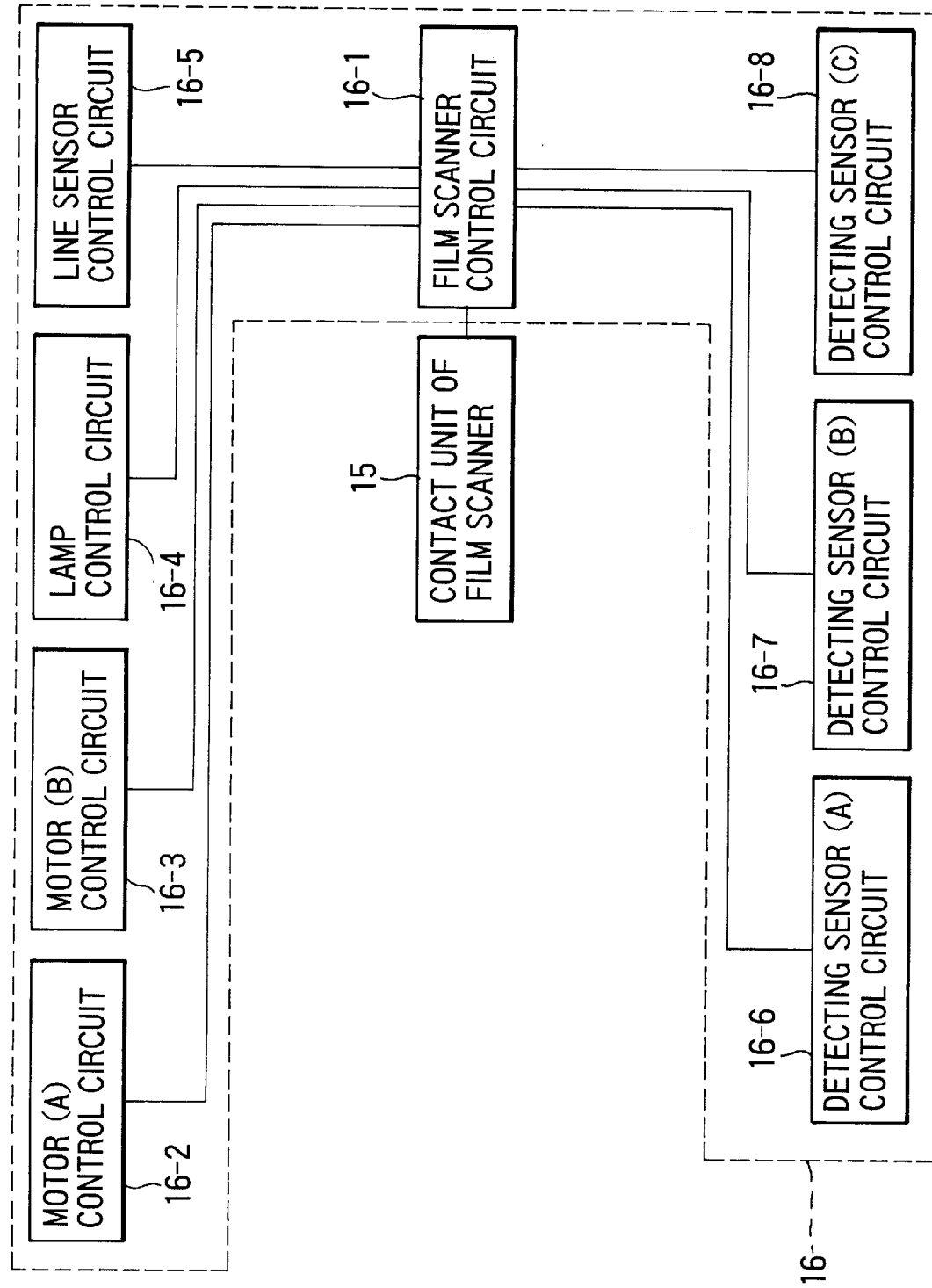
FIG. 4 is a block diagram showing a circuit structure of the film scanner according to the first embodiment.
Figure 5:
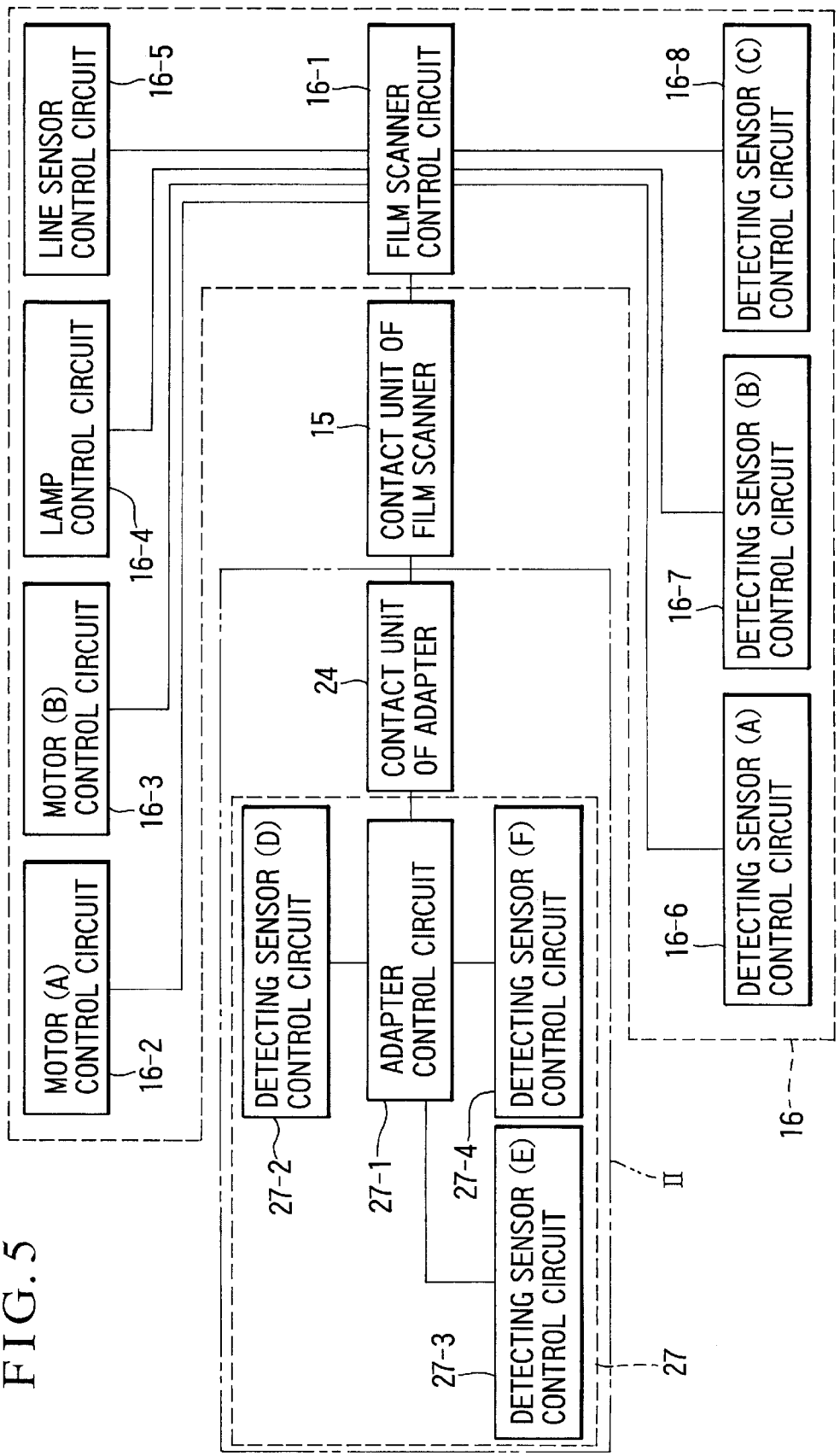
FIG. 5 is a diagram showing a circuit structure of the film scanner according to the first embodiment with the adapter being mounted thereto.
Figure 6:
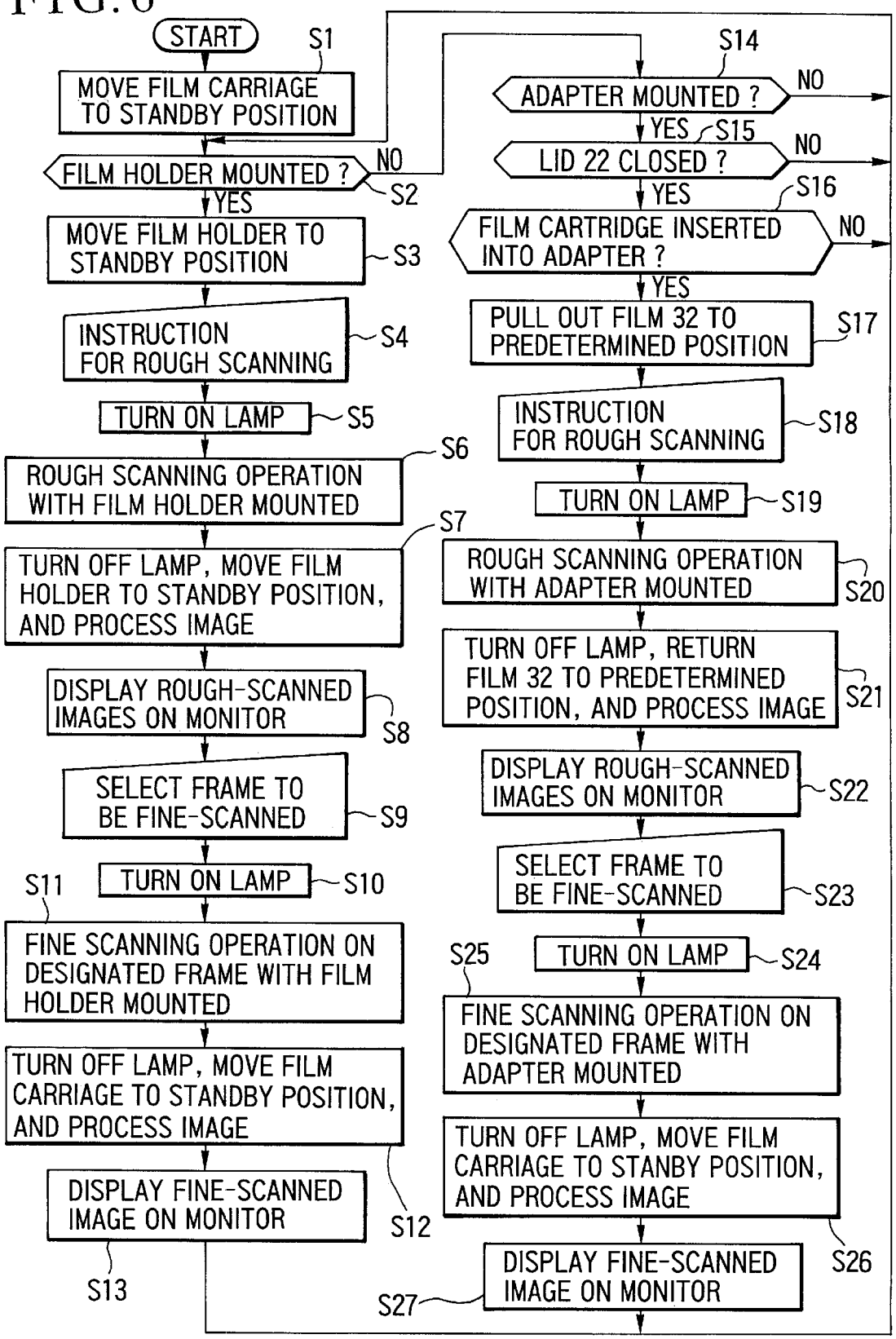
FIG. 6 is a flow chart showing the operation of the film scanner according to the first embodiment.
Figure 7:
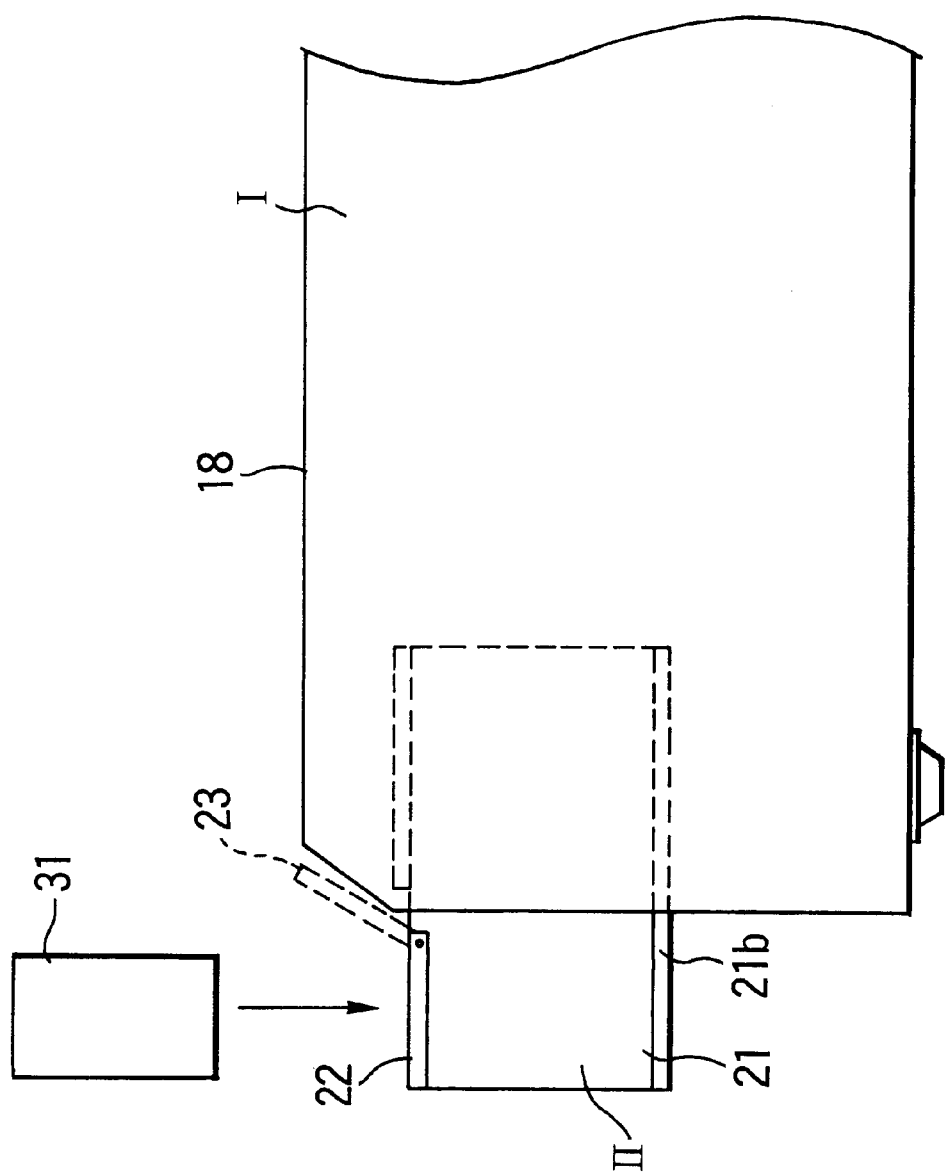
FIG. 7 is a side view of the film scanner according to the first embodiment with the adapter being mounted thereto.
Figure 10:
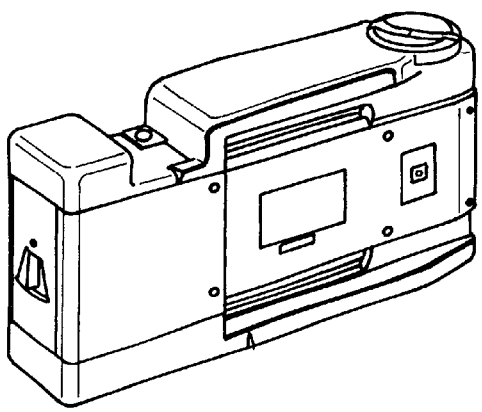
FIG. 10 is a perspective view of the adapter for mounting a cartridge film into the film scanner.

FIG. 1 is a perspective view showing a construction of principal parts of the film scanner according to the first embodiment when a film holder, which is an accessory, is mounted to the film scanner. FIG. 2 is a diagram showing a schematic construction of the film scanner according to the first embodiment, which is shown in FIG. 1, when the film holder, which is shown in FIG. 1, is mounted to the film scanner. FIG. 3 is a diagram showing a schematic construction of the film scanner according to the first embodiment when an adapter, which is another accessory and is used for a cartridge film shown in FIG. 10, is mounted to the film scanner. FIG. 4 is a block diagram showing a circuit structure of the film scanner shown in FIG. 1, and FIG. 5 is a block diagram showing a circuit structure of the film scanner, shown in FIG. 1, when an adapter II is mounted to the film scanner. FIG. 6 is a flow chart showing the operation of the film scanner shown in FIG. 1, and FIG. 7 is a side view of the film scanner, shown in FIG. 1, when the adapter II is mounted to the film scanner. Incidentally, while the adapter II is the same as the adapter shown in FIG. 10, the adapter II is illustrated in somewhat simplified fashion.

In FIG. 1, reference symbol I denotes a film scanner body, and reference symbol II denotes an adapter which is mountable to the film scanner body I and is used for reading an image recorded on a film contained in a dedicated cartridge.

Referring to FIGS. 1 through 3, reference numeral 1 denotes a film carriage, which has mounting portions 1a and 1b for mounting thereto a film holder 7 or the adapter II. In addition, the film carriage 1 is supported to be freely movable with respect to the film scanner body I in the scanning directions shown by a double-headed arrow in FIGS. 1 through 3. Reference numeral 2 denotes a lamp which is a light source, reference numeral 3 denotes a mirror, reference numeral 4 denotes a lens, reference numeral 5 denotes a lens holder which holds the lens 4, and reference numeral 6 denotes a line sensor composed of a CCD. The film holder 7 has window portions 7a through 7f. A developed film (35 mm film or the like) 8 has six continuous frames and is held by the film holder 7, and the respective frames of the film 8 are exposed to the outside of the film holder 7 with the window portions 7a through 7f, so that light can pass through the film 8. In addition, the film holder 7 has such a shape the film holder 7 is held in the mounting portions 1a and 1b so as to be freely movable in the scanning directions (the directions of the arrow in FIG. 1) (FIG. 1 shows a state where the film holder 7 is mounted to the mounting portions 1a and 1b).

In addition, light from the lamp 2 passes through the film 8, and is then reflected by the mirror 3 to be imaged on the line sensor 6 by the lens 4. In addition, an optical axis 9 reaches the line sensor 6 from the lamp 2, a motor (A) 10 moves the film carriage 1 in the scanning directions for scanning, and a motor (B) 11 moves the film holder 7 in the scanning directions for selecting a film frame and transports the film 32 contained in the adapter II for winding and rewinding the film 32.

A detecting sensor (A) 12 detects the position of the film carriage 1, a detecting sensor (B) 13 detects that the film holder 7 is mounted to the film scanner body I and further detects the position of the film holder 7, and a detecting sensor (C) 14 detects that the adapter II is mounted to the film scanner body I. Reference numeral 15 denotes a contact unit of the film scanner body I for electrically contacting to the adapter II, reference numeral 16 denotes a control circuit (A), reference numeral 17 denotes an input and output terminal, and reference numeral 18 is an exterior case of the film scanner body I. In addition, the motor (B) 11, the contact unit 15, the detecting sensor (B) 13, and the detecting sensor (C) 14 are provided on the film carriage 1.

Figure 11:
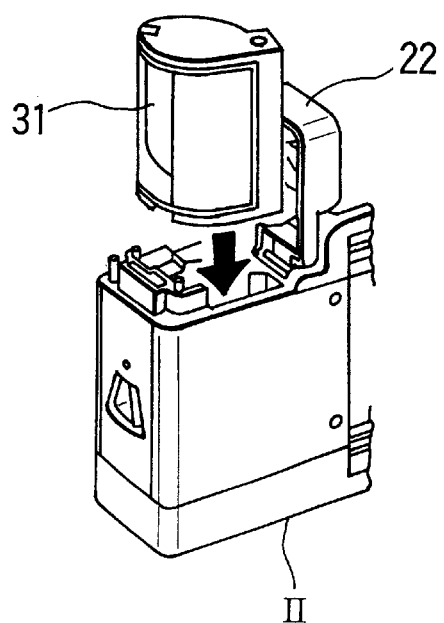
FIG. 11 is a schematic diagram showing a manner where the cartridge film is being loaded into the adapter.

An exterior cover 21 of the adapter II has protruding portions 21a and 21b for engaging with the mounting portions 1a and 1b of the film carriage 1. A lid 22 covers a port provided in the exterior cover 21 for inserting therein the film cartridge and taking out the film cartridge, and a two-dot chain line 23 indicates the lid 22 which is opened for loading the film cartridge to and/or unloading the film cartridge from the adapter II as shown in FIG. 11. Reference numeral 24 denotes a contact unit of the adapter II, reference numeral 25 denotes a film window, reference numeral 26 denotes a lever for opening the lid 22, and reference numeral 27 denotes a control circuit (B) for controlling the adapter II. A detecting sensor (D) 28 detects a state of the film in the adapter II, and a detecting sensor (E) 29 detects the presence and absence of the film cartridge in the adapter II. Furthermore, a detecting sensor (F) 30 detects a state of opening or closing of the lid 22. Reference numeral 31 denotes the film cartridge containing a dedicated film, which is inserted in the adapter II, and reference numeral 32 denotes the film pulled out from the film cartridge 31.

In addition, the lamp 2, the line sensor 6, the motor (A) 10, the motor (B) 11, the detecting sensor (A) 12, the detecting sensor (B) 13, the detecting sensor (C) 14, the input and output terminal 17, and the film scanner contact unit 15 are electrically connected to the control circuit (A) 16.

Furthermore, the detecting sensor (D) 28, the detecting sensor (E) 29, the detecting sensor (F) 30, and the adapter contact unit 24 are electrically connected to the control circuit (B) 27.

Moreover, the control circuit (A) 16, as shown in FIGS. 4 and 5, is composed of a film scanner control circuit 16-1, a motor (A) control circuit 16-2, a motor (B) control circuit 16-3, a lamp control circuit 16-4, a line sensor control circuit 16-5, a detecting sensor (A) control circuit 16-6, a detecting sensor (B) control circuit 16-7, and a detecting sensor (C) control circuit 16-8. In addition, the control circuit (B) 27 is composed of an adapter control circuit 27-1, a detecting sensor (D) control circuit 27-2, a detecting sensor (E) control circuit 27-3, and a detecting sensor (F) control circuit 27-4.

Moreover, position detecting means for detecting the position of the film carriage 1 is composed of the detecting sensor (A) 12 and the detecting sensor (A) control circuit 16-6, and detection means for detecting the mounting of the film holder 7 to the film scanner body I and detecting the position of the film holder 7 is composed of the detecting sensor (B) 13 and the detecting sensor (B) control circuit 16-7. In addition, detection means for detecting the mounting of the adapter II to the film scanner body I is composed of the detecting sensor (C) 14 and the detecting sensor (C) control circuit 16-8.

Furthermore, detection means for detecting a state of the film in the adapter II is composed of the detecting sensor (D) 28 and the detecting sensor (D) control circuit 27-2. Moreover, detection means for detecting the presence and absence of the film cartridge 31 in the adapter II is composed of the detecting sensor (E) 29 and the detecting sensor (E) control circuit 27-3. In addition, detection means for detecting a state of opening and closing of the lid 22 of the adapter II id composed of the detecting sensor (F) 30 and the detecting sensor (F) control circuit 27-4.

Next, the method of reading image information recorded on the film 8 or 32 will be described with reference to the flow chart of FIG. 6.

First, when electric power is applied from a power supply (not shown) to the film scanner body I by operating a power switch (not shown), the position of the film carriage 1 is detected by the detecting sensor (A) 12 and the detecting sensor (A) control circuit 16-6. This position information is transmitted to the film scanner control circuit 16-1. Then, so as to make the film carriage 1 wait at a predetermined standby position, the motor (A) 10 is driven by the motor (A) control circuit 16-2 to move the film carriage 1 to the standby position (S1). Furthermore, if the detecting sensor (B) 13 and the detecting sensor (B) control circuit 16-7 detect that the film holder 7 is mounted to the film carriage 1 (S2, YES), at the same time, the detecting sensor (B) 13 and the detecting sensor (B) control circuit 16-7 detect the position of the film holder 7 also. This position information is transmitted to the film scanner control circuit 16-1. Then, so as to make the film holder 7 wait at a predetermined standby position, the motor (B) 11 is driven by the motor (B) control circuit 16-3 to move the film holder 7 to the standby position (S3). When the user of the film scanner operates the film scanner with a known method to issue an instruction for rough scanning (S4), the lamp control circuit 16-4 turns on the lamp 2 (S5), and the known rough scanning operation of images of six frames of the film 8 is performed (S6). When the rough scanning operation is completed, the lamp 2 is turned off by the lamp control circuit 16-4, and the film holder 7 is returned to the standby position to perform predetermined image processing (S7). Then, the images are displayed on a monitor (not shown) (S8). Furthermore, when the user selects an image to be fine-scanned among the six frames of images and operates the film scanner with a known method (S9), the lamp 2 is turned on by the lamp control circuit 16-4 (S10), and a known fine scanning operation of the selected frame is performed by moving the film carriage 1 (S11). Moreover, after completion of the fine scanning operation, the lamp 2 is turned off by the lamp control circuit 16-4, the film carriage 1 is returned to the standby position, and image processing is performed (S12). Then, the image is displayed on the monitor (S13).

In addition, if the detecting sensor (C) 14 and the detecting sensor (C) control circuit 16-8 detect that the adapter II is loaded into the film scanner body I, this information is transmitted to the film scanner control circuit 16-1. Furthermore, at this time, the film scanner contact unit 15 and the adapter contact unit 24 are electrically connected to each other. Thus, the control circuit (A) 16 and the control circuit (B) 27 are electrically connected to each other. Moreover, the film scanner control circuit 16-1 and the adapter control circuit 27-1 start communication and confirm whether the adapter II is correctly mounted to the film scanner body I or whether the adapter II is normally operating. In addition, after completion of this confirmation, electric power is supplied from the film scanner body I to the adapter II through the film scanner contact unit 15 and the adapter contact unit 24. Furthermore, if the adapter II is mounted to the film scanner body I, the motor (B) 11 is coupled to a transport mechanism (not shown) for the film 32 in the adapter II.

Then, the presence or absence of the film cartridge 31 is detected by the detecting sensor (E) 29 and the detecting sensor (E) control circuit 37-3. If it is detected that the film cartridge 31 is inserted into the adapter II (S14), a state of opening and closing of the lid 22 is detected by the detecting sensor (F) 30 and the detecting sensor (F) control circuit 27-4. In addition, if it is detected here that the lid 22 is closed (S15), the detecting sensor (D) 28 and the detecting sensor (D) control circuit 27-2 detect a state of the film 32, and this information is transmitted from the adapter control circuit 27-1 to the film scanner control circuit 16-1. Then, the motor (B) control circuit 16-3 drives the motor (B) to pull out the film 32 to a predetermined position in the adapter II (S17). Moreover, when the user operates the film scanner body I and issues an instruction for rough scanning, the lamp control circuit 16-4 turns on the lamp 2 (S19) and the known rough scanning operation is performed (S20). When the rough scanning operation is completed, the lamp 2 is turned off by the lamp control circuit 16-4, the film 32 is returned to the predetermined position in the adapter II, and predetermined image processing is performed (S21). Then, a plurality of images obtained by the rough scanning operation are displayed on the monitor (not shown) (S22). When the user selects an image to be fine-scanned among the plurality of images and operates the film scanner with a known method (S23), the lamp 2 is turned on by the lamp control circuit 16-4 (S24), and the known fine scanning operation on the selected image is performed by moving the film carriage 1 (S25). After completion of the fine scanning operation, the lamp 2 is turned off by the lamp control circuit 16-4, the film carriage 1 is returned to the standby position, and image processing is performed (S26). Then, the image is displayed on the monitor (not shown) (S27).

Here, the adapter II has such a construction that the lid 22 can be opened and closed only when the film cartridge 31 is not inserted, or when the film cartridge 31 is inserted and the film 32 is not pulled out from the film cartridge 31. In addition, the adapter control circuit 27-1 and the film scanner control circuit 16-1 control the adapter II and the film scanner respectively lest the motor (A) 10 and motor (B) 11 should be driven for rough scanning or fine scanning if the detecting sensor (F) 30 and the detecting sensor (F) control circuit 27-4 detect that the lid 22 is opened, and if the detecting sensor (E) 29 and the detecting sensor (E) control circuit 27-3 detect that the film cartridge 31 is not inserted into the adapter II even if the lid 22 is closed.

In addition, since insertion of the adapter II into and removal of the adapter II from the film carriage 1 become possible when the film carriage 1 is located at a predetermined standby position with respect to the film scanner body I (refer to FIG. 7), the adapter II can be easily mounted into the film scanner body I.

Furthermore, as shown in FIG. 7, the film scanner is constructed so that the lid 22 of the adapter II mounted to the film carriage 1 can be opened and closed at the standby position of the film carriage 1 and so that the lid 22, which is opened, may not interfere with the exterior cover 18 of the film scanner body I at that time. Owing to this construction, it is possible to insert the film cartridge 31 into and remove the film cartridge 31 from the adapter II with the adapter II remaining mounted to the film scanner body I without need to remove the adapter II from the film scanner body I.

In summary, the film scanner is constructed so that the film 8 or the film cartridge 31 can be inserted into the film holder 7 or the adapter II respectively with the film holder 7 or the adapter II remaining mounted to the film scanner body I. In addition, the film scanner is constructed so that the film 8 or the film cartridge 31 can be inserted into and removed from the film holder 7 or the adapter II respectively when the film holder 7, the adapter II or the film cartridge 31 is at a predetermined position. Furthermore, by constructing the film scanner so that such insertion or removal position may become a loading or unloading position of the film holder 7 or the adapter II, the operability of the film scanner becomes better. Moreover, the film scanner can read an image of a film contained in a dedicated cartridge, the lid 22 of the adapter II can be opened when the adapter II is located at a predetermined position with respect to the film scanner body I, and the film cartridge 31 can be inserted and removed at the predetermined position. In addition, the film scanner is constructed so that the lid 22 may not interfere with the film scanner body I even if the lid 22 is opened at the predetermined position and so that the film 32 can be transported only when the lid 22 is closed. Furthermore, the film scanner is constructed so that the lid 22 cannot be opened during transportation of the film 32 and so that an image reading operation including the movement of the film carriage 1 in the film scanner body I can be performed only when the film 32 is transported to be ready for image reading at the time of the adapter II being mounted to the film scanner body I. Moreover, in the first embodiment, the film cartridge 31 can be inserted in and removed from the direction above the adapter II at the time of the adapter II being mounted in the film scanner body I. Nevertheless, even if the film scanner is constructed so that the film cartridge 31 can be inserted in and removed from the horizontal direction, the film cartridge 31 can be easily inserted into and removed from the adapter II mounted in the film scanner body I. In addition, the film scanner has power supply means and communication means from the film scanner body I to the adapter II, and is constructed so that the adapter II can be controlled from the side of the film scanner body I.

(Second Embodiment)

Figure 8:
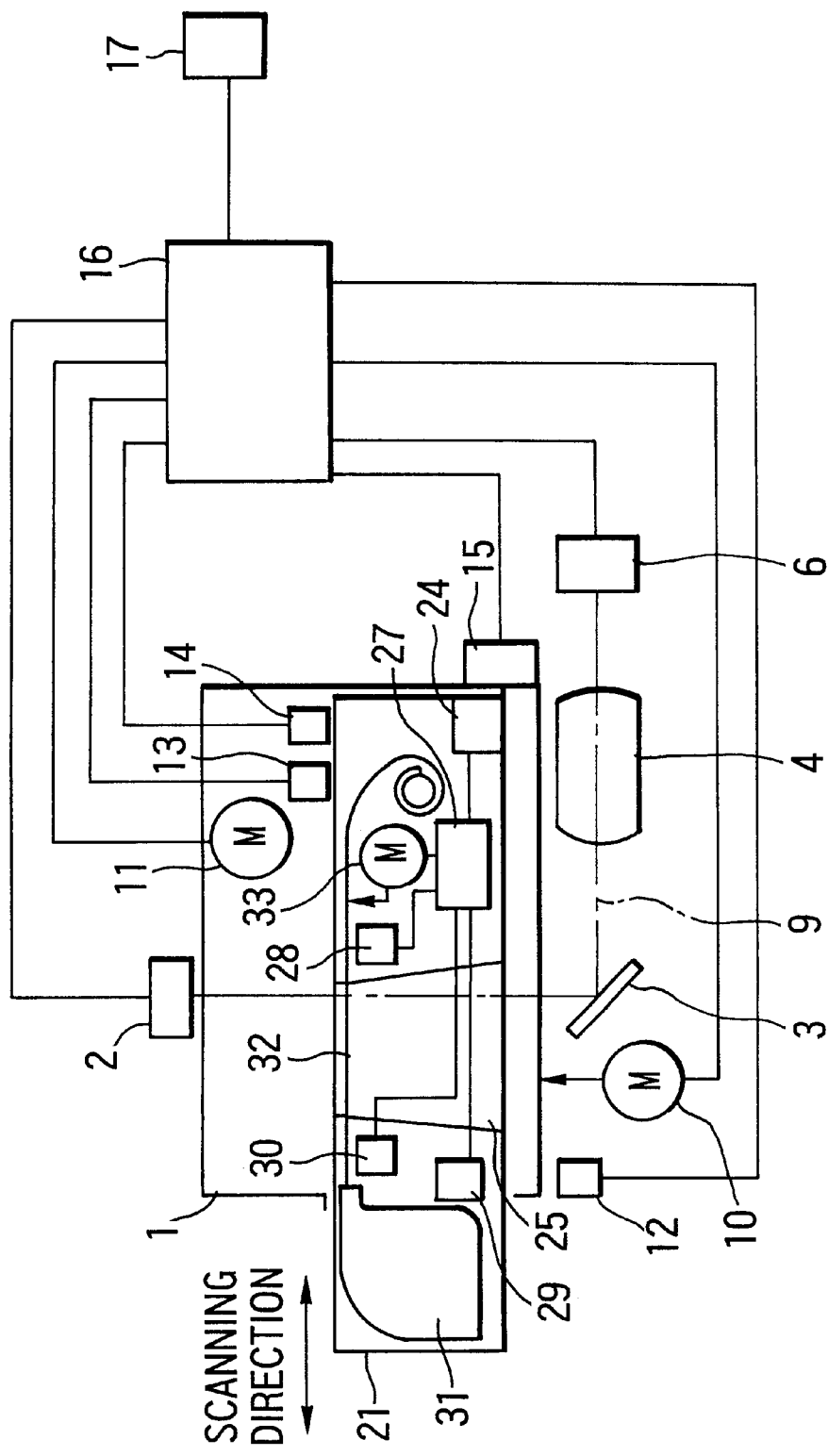
FIG. 8 is a diagram showing a schematic construction of a film scanner according to a second embodiment of the present invention with an adapter being mounted thereto.
Figure 9:
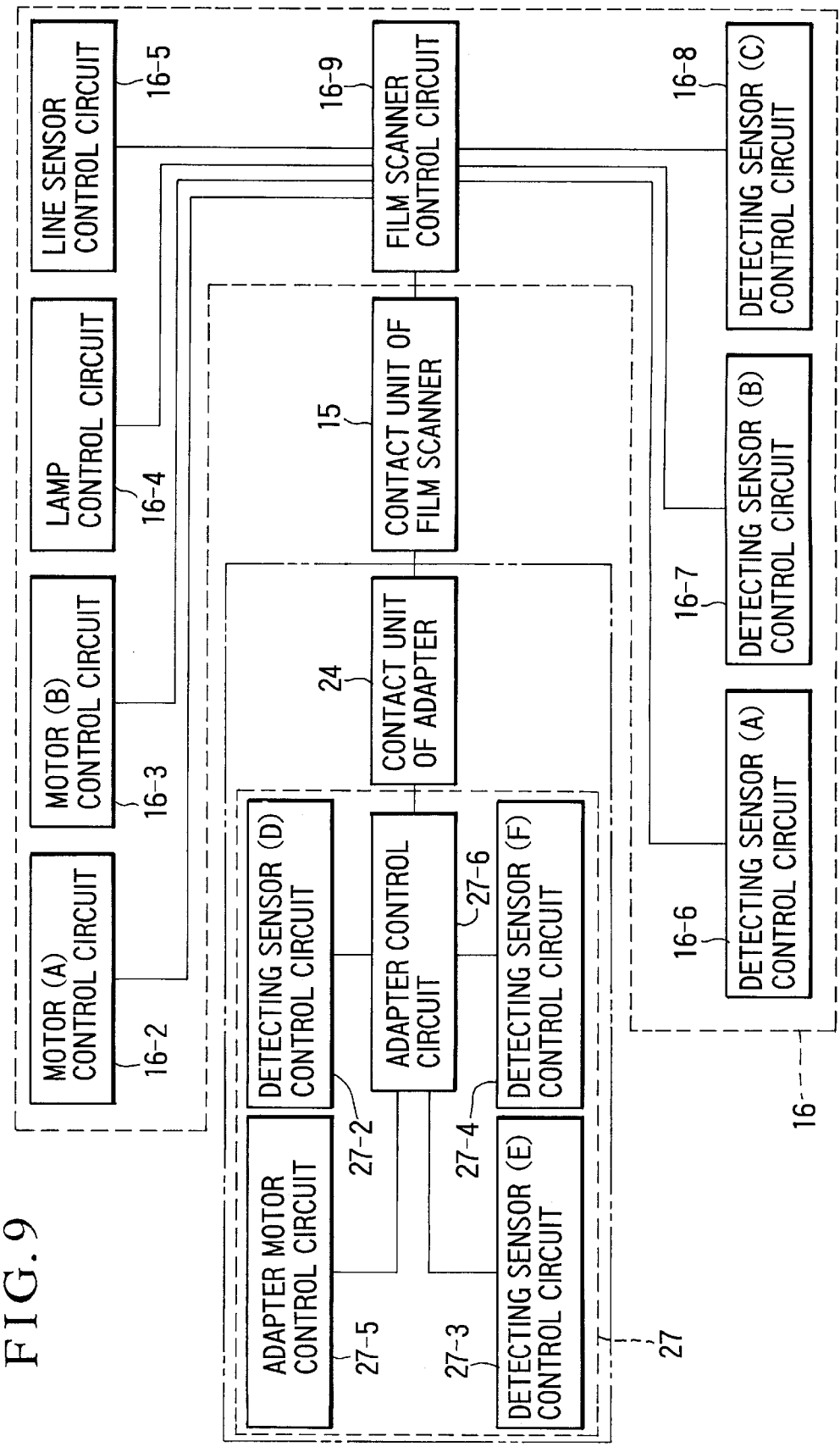
FIG. 9 is a diagram showing a circuit structure of the film scanner according to the second embodiment with the adapter being mounted thereto.

A film scanner according to a second embodiment of the present invention will be described with reference to FIGS. 8 and 9. FIG. 8 is a diagram showing a schematic construction of the film scanner according to the second embodiment when an adapter is loaded into a film scanner body, and FIG. 9 is a block diagram showing a circuit structure of the film scanner shown in FIG. 8 when the adapter is loaded into the film scanner body. In addition, in regard to the second embodiment, a perspective view of essential parts, a diagram showing a schematic construction at the time of a film holder being loaded, a block diagram showing a circuit structure, a flow chart showing an operation, and a side view at the time of the adapter being loaded are the same as those in FIGS. 1, 2, 4, 6, and 7, respectively, and hence these figures are omitted. Furthermore, in FIG. 8, the same reference numerals are assigned to the parts that are the same as those in the first embodiment, and hence description of these parts is omitted.

In FIG. 8, reference numeral 33 denotes an adapter motor which performs transportation, that is, winding and rewinding of a film 32 contained in a film cartridge 31 in the adapter II.

The difference of the second embodiment from the first embodiment is that the motor (B) 11 provided in the film scanner body I is used only for moving the film holder 7 in the scanning directions and the transportation of the film 32 contained in the film cartridge 31 in the adapter II is performed by the adapter motor 33 provided in the adapter II. Furthermore, another difference is that the control circuit (B) 27 is composed of an adapter control circuit 27-6, the detecting sensor (D) control circuit 27-2, detecting sensor (E) control circuit 27-3, detecting sensor (F) control circuit 27-4, and an adapter motor control circuit 27-5.

Owing to this construction, although the adapter motor 33 should be provided, it is not necessary to provide the complicated driving-force transmission mechanism (not shown) for transporting the film 32 in the adapter II by the motor (B), and the driving-force change-over mechanism (not shown) from the motor (B) to the adapter II, which are provided in the first embodiment. Therefore, it is possible to make the construction of the film scanner body simple and to construct the adapter mountable in the film scanner body. In addition, since the drive of the film holder 7 and the transportation of the film 32 are performed by a dedicated motor without using the complicated mechanism, highly accurate drive and transportation can be performed.

Other constructions and control relating to the film scanner body I and adapter II are the same as those in the first embodiment, and hence description of these is omitted.

As described above, according to the first and second embodiments, it is possible to provide an image reading apparatus capable of reading a plurality of kinds of transparent originals and having excellent operability with a simple construction.

In detail, it is possible to selectively mount a plurality of kinds of accessories to the image reading apparatus, and because a transparent original can be loaded to and unloaded from the accessory with the accessory, which is mounted, remaining attached, it is possible to read a plurality of kinds of transparent originals. Furthermore, it is possible to load a desired transparent original to and unload the desired transparent original from the accessory without detaching the accessory, which is attached to the image reading apparatus, from the image reading apparatus when reading a plurality of transparent originals whose kinds are the same.

In addition, it is possible to load a transparent original to and unload the transparent original from an accessory only when the accessory mounted to the image reading apparatus is located at a predetermined position with respect to the body of the image reading apparatus. Therefore, when the user loads the transparent original to or unloads the transparent original from the accessory, the accessory is located at a predetermined position with respect to the body of the image reading apparatus, and hence it is easy to load and unload the transparent original.

Furthermore, it is designed that a position where a transparent original can be loaded to and unloaded from an accessory is a position where the accessory is attached to and detached from the image reading apparatus. Therefore, a state of the accessory, where the transparent original is loaded, being mounted is the same as a state of the transparent original being loaded in the accessory which is mounted in the image reading apparatus. Hence, it is easy to control the image reading apparatus because reading of an original image can be started from the state of the accessory being the same.

Moreover, the image reading apparatus is adapted to a transparent original contained in a dedicated cartridge.

In addition, it is possible to prevent the user from carelessly touching a cartridge containing a transparent original inserted in an accessory and to prevent dust from invading the accessory.

Furthermore, it is possible to prevent a lid from carelessly opening at the time of reading an image of a transparent original contained in a dedicated case. Moreover, it is possible to prevent the user from making misoperation, to have excellent operability, and to obtain a stable image, because a cartridge in an accessory can be exchanged only at a predetermined position.

In addition, insertion of a cartridge into and removal of a cartridge from an accessory are easy and operability is excellent, because a lid of the accessory does not interfere with the body of the image reading apparatus when the cartridge containing a dedicated film is inserted into or removed from the accessory mounted to the body of the image reading apparatus.

Furthermore, since it is possible to prevent the user from erroneously touching a transparent original and a cartridge during transportation of a film contained in the cartridge in an accessory, it is possible to obtain a safe and stable image.

Moreover, since an accessory has a motor for transporting a transparent original inserted into the accessory, it is not necessary to provide a complicated driving-force transmission mechanism from a body of the image reading apparatus to the accessory and a driving-force change-over mechanism. Therefore, it is possible to make a construction of the image reading apparatus simple.

In addition, it is designed that image reading is performed by moving a film carriage, which is an original placing board, only when a transparent original in an accessory is transported and the image reading becomes ready. Hence, it is not necessary to perform a useless operation, and it is possible to make the power consumption of the image reading apparatus low.

Furthermore, even if an accessory where a cartridge containing a dedicated film can be inserted and removed is mounted to a body of the image reading apparatus, it is possible to easily insert the cartridge into and remove the cartridge from the accessory. Hence, operability is excellent.

Moreover, since electric power is supplied from a body of the image reading apparatus to an accessory where a cartridge containing a dedicated film can be inserted and removed, it is not necessary that the accessory has a power supply separately. In addition, since the image reading apparatus has communication means between a body of the image reading apparatus and the accessory, it is possible to control the body of the image reading apparatus and the accessory. Hence, it is possible to obtain the image reading apparatus which can be easily controlled and is small.

Furthermore, it is possible to read an image of a film being bare such as a 35 mm film by means of a film holder, and it is possible to read an image of a dedicated film in a cartridge such as an APS (Advanced Photo System) film by using an adapter instead of the film holder.

(Third Embodiment)

Figure 12:
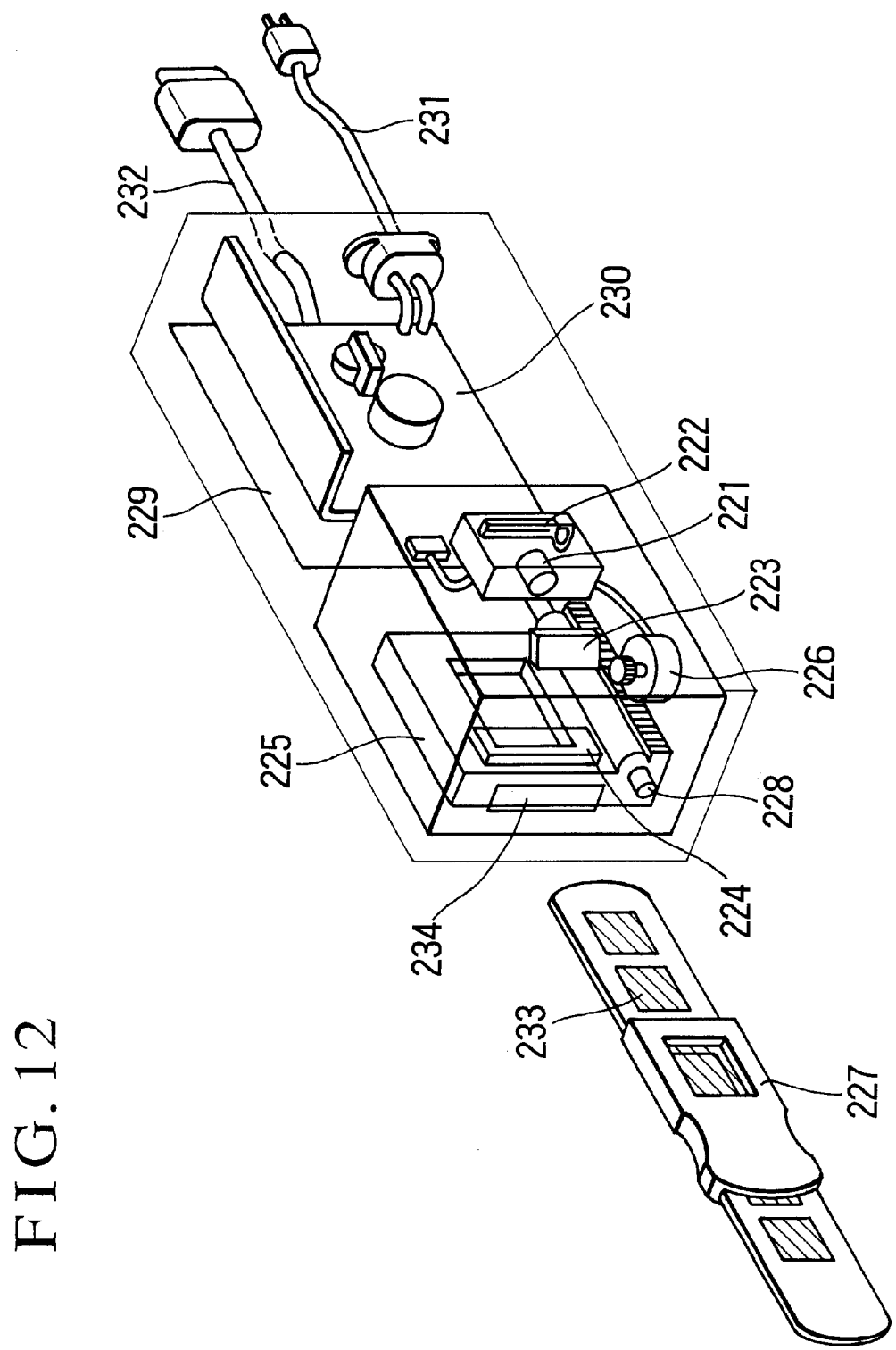
FIG. 12 is a perspective view of a film scanner according to a third embodiment of the present invention.

FIG. 12 is a perspective view for explaining the construction of a film scanner (image reading apparatus) according to a third embodiment of the present invention. In FIG. 12, a line CCD sensor 222 is located on a focal plane of the lens 221, which is an image forming optical system, and performs photoelectric conversion. Further, a mirror 223 refracts an optical axis of the lens 221 by 90°, a cold cathode ray tube 224 is an illumination means, and a film holder carriage 225 is held so that the film holder carriage 225 can move across the optical axis of the lens 221. Moreover, a stepping motor 226 constitutes a movement means for moving the film holder carriage 225.

A film holder 227 sandwiches a film 233 and is used for reading an image by being inserted into the film holder carriage 225, and a guide shaft 228 guides the film holder carriage 225 in a moving direction thereof. In addition, an image processing circuit board (a first circuit board) performs control and signal processing of the entire apparatus, and a power supply circuit board (a second circuit board) 230 is provided for supplying electric power from an input power supply to the apparatus. Furthermore, a power cable 231 is used for supplying electric power from an external power supply to the apparatus, and a communication cable 232 is used for outputting an image signal to another apparatus or receiving an instruction from another apparatus.

Next, reading of an image recorded on the film 233 will be described. First, the film holder 227 is inserted from a loading slot 234 into the film scanner. The power supply circuit board 230 receives an alternating current through the power cable 231, and supplies necessary electric power to the image processing circuit board 229.

When reading is started, the cold cathode ray tube 224 is turned on, and light passing through the film 233 is refracted by the mirror 223 by 90° and is then imaged on the CCD line sensor 222 by the lens 221. The light is converted into an image signal by the CCD sensor 222, the image processing circuit board 229 performs predetermined processing of the image signal, and an image signal that is equivalent to one line of an external device connected is outputted.

Next, the stepping motor 226 moves the film carriage 225 by a distance equivalent to one line to read the next line of image. By repeating the above operation, an image signal equivalent to one frame of film is outputted.

In addition, in FIG. 12, although the reading method for the sleeved film is described, it is also possible to read an image of a slide-mounted film by inserting the slide-mounted film from the loading slot 234. Furthermore, in regard to a different type of film such as a cartridge film, as described later in FIG. 15, it is possible that a dedicated adapter 208 for pulling out the film is inserted similarly to the method described in FIG. 12 after pulling out the film with the adapter 208 and changing to a film inserting slot 202a of the film scanner body 201.

Figure 13:
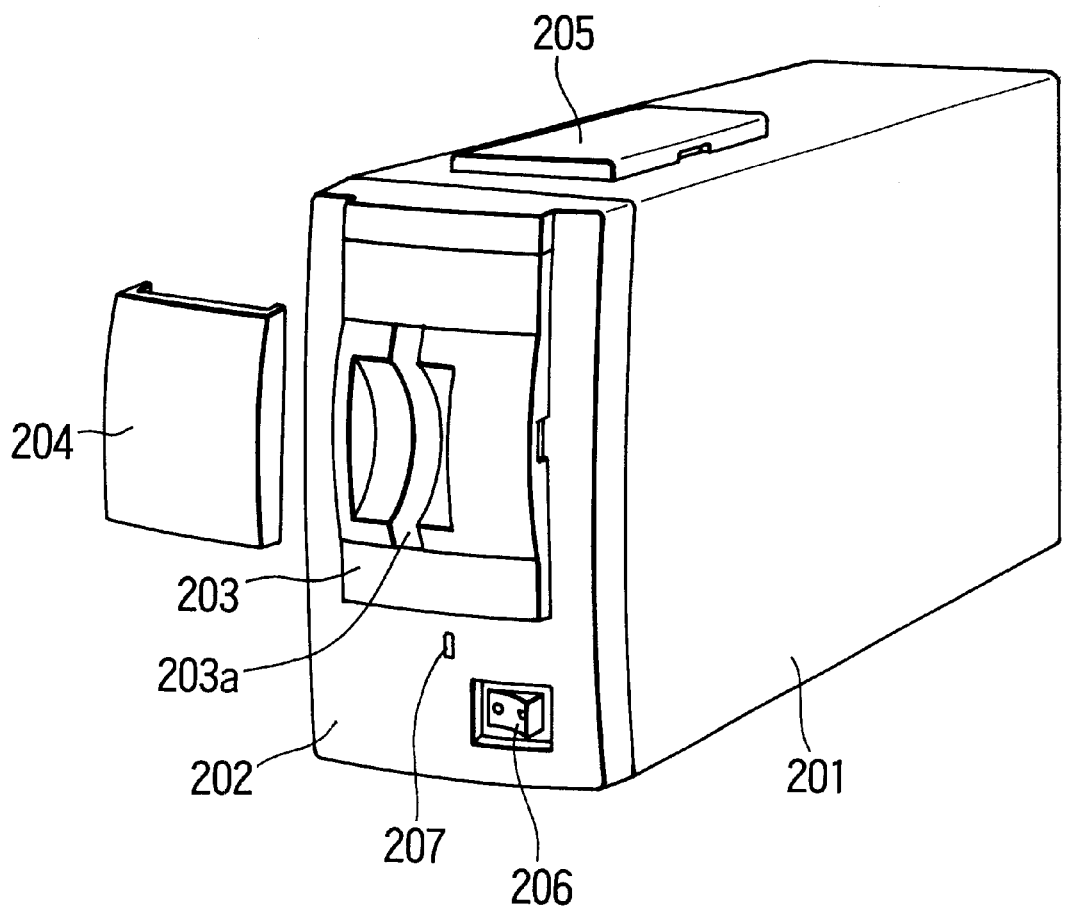
FIG. 13 is a perspective view showing an appearance of the film scanner according to the third embodiment.

FIG. 13 is a perspective view showing the film scanner according to the third embodiment. In FIG. 13, reference numeral 201 denotes the film scanner body, reference numeral 202 denotes a front cover, reference numeral 203 denotes a door for changing the size of a film inserting slot, reference numeral 203a denotes a first film inserting slot, and reference numeral 204 denotes a lid for covering the inserting slot 203a. Furthermore, reference numeral 206 denotes a power switch, and reference numeral 207 denotes an LED lamp indicating that a power supply is turned on. Reference numeral 205 denotes a mounting portion for temporarily attaching thereto the lid 204 removed.

Figure 14:
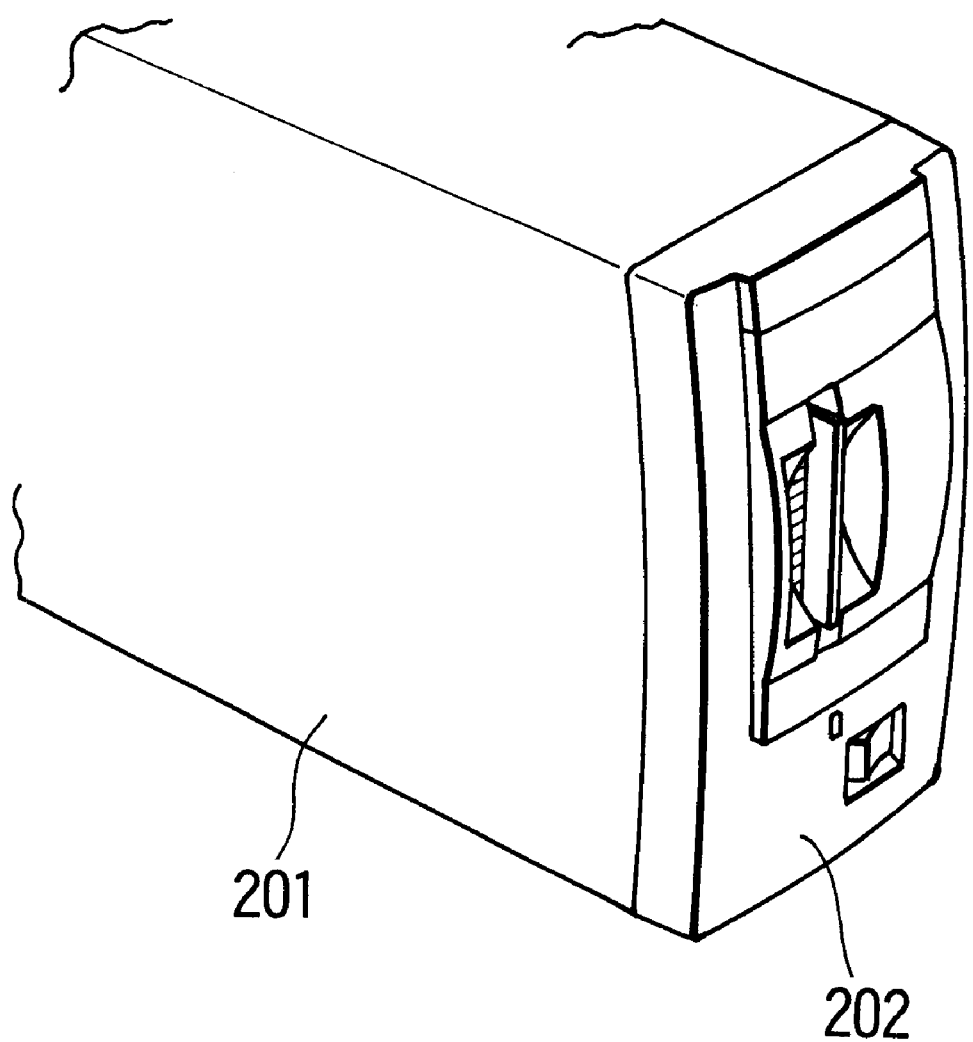
FIG. 14 is a diagram showing a manner where a slide-mounted film is located at an eject position in the film scanner according to the third embodiment.

FIG. 14 is a diagram showing a state where a slide-mounted film is inserted into the film scanner body 201, and, also when the slide-mounted film is about to be removed from the film scanner body 201, this state also occurs.

Figure 15:
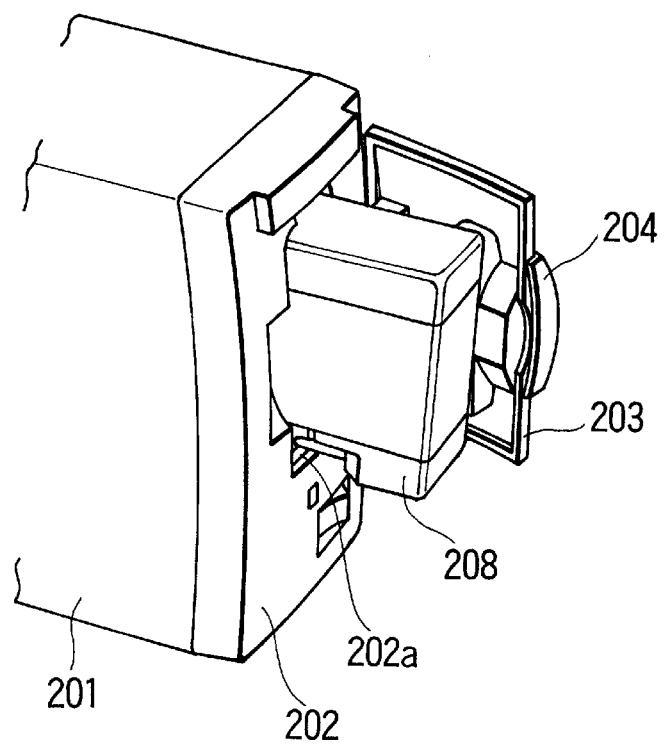
FIG. 15 is a diagram showing a manner where a cartridge film adapter is being inserted into the film scanner according to the third embodiment.

FIG. 15 is a diagram showing the second film inserting slot 202a in a state where the cartridge film adapter 208 is inserted after opening the door 203 of the film scanner body 201 shown in FIG. 13. In FIG. 15, the lid 204 is attached to the door 203.

Figure 16:
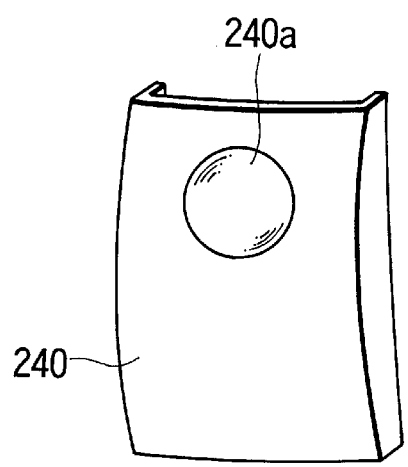
FIG. 16 is a diagram showing a modification example of the lid in the third embodiment.

In addition, FIG. 16 is a diagram showing a lid 240 which is a modification of the lid 204 shown in FIG. 13. The lid 240 is made of transparent plastic such as acrylic resin and polycarbonate resin. A convex lens portion 240a, which is provided in the lid 240, is made at the same time as the lid 240 by injection molding. The convex lens portion 240a can be assembled by inserting a lens into the lid after making the lens separately. In this case, it is apparent that material of the lid is not limited to transparent material.

(Fourth Embodiment)

Figure 17:
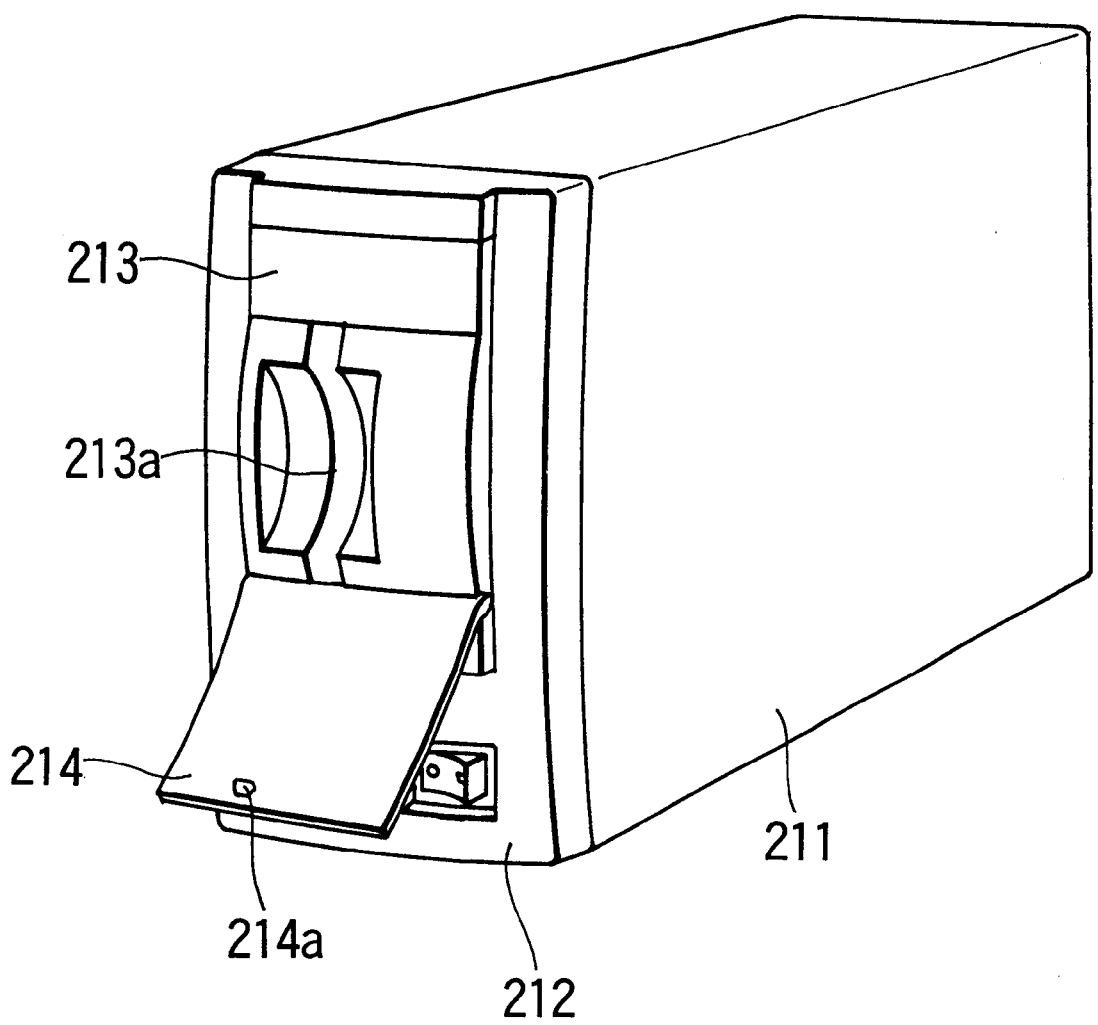
FIG. 17 is a perspective view of a film scanner according to a fourth embodiment of the present invention.

FIG. 17 is a perspective view showing a film scanner according to a fourth embodiment of the present invention. In FIG. 17, reference numeral 211 denotes a film scanner body, reference numeral 213 denotes a door for changing the size of a film inserting slot, and reference numeral 213a denotes a first film inserting slot. Furthermore, reference numeral 214 denotes a movable lid for covering the inserting slot 213a, reference numeral 214a denotes a catch pawl for keeping the door 214 closed, and reference numeral 212 denotes a front cover holding the door 214.

(Fifth Embodiment)

Figure 18:
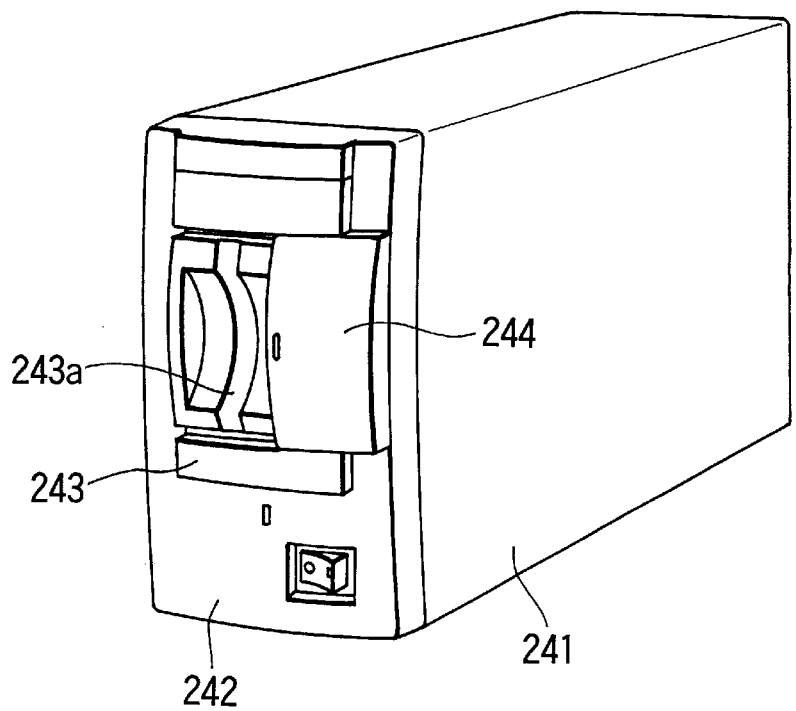
FIG. 18 is a perspective view of a film scanner according to a fifth embodiment of the present invention.

FIG. 18 is a perspective view of a film scanner according to a fifth embodiment of the present invention. In FIG. 18, reference numeral 241 denotes a film scanner body, and reference numeral 242 denotes a front cover. In addition, reference numeral 243 denotes a door for changing the size of a film inserting slot, reference numeral 243a denotes a first film inserting slot, and reference numeral 244 denotes a sliding lid for covering the film inserting slot 243a.

(Sixth Embodiment)

Figure 19:
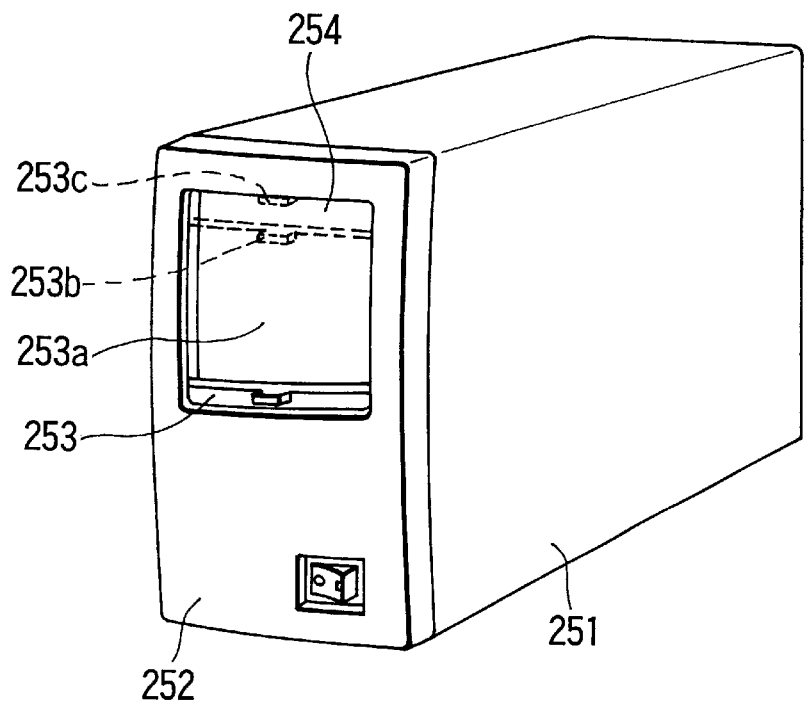
FIG. 19 is a film scanner according to a sixth embodiment of the present invention.
Figure 20:
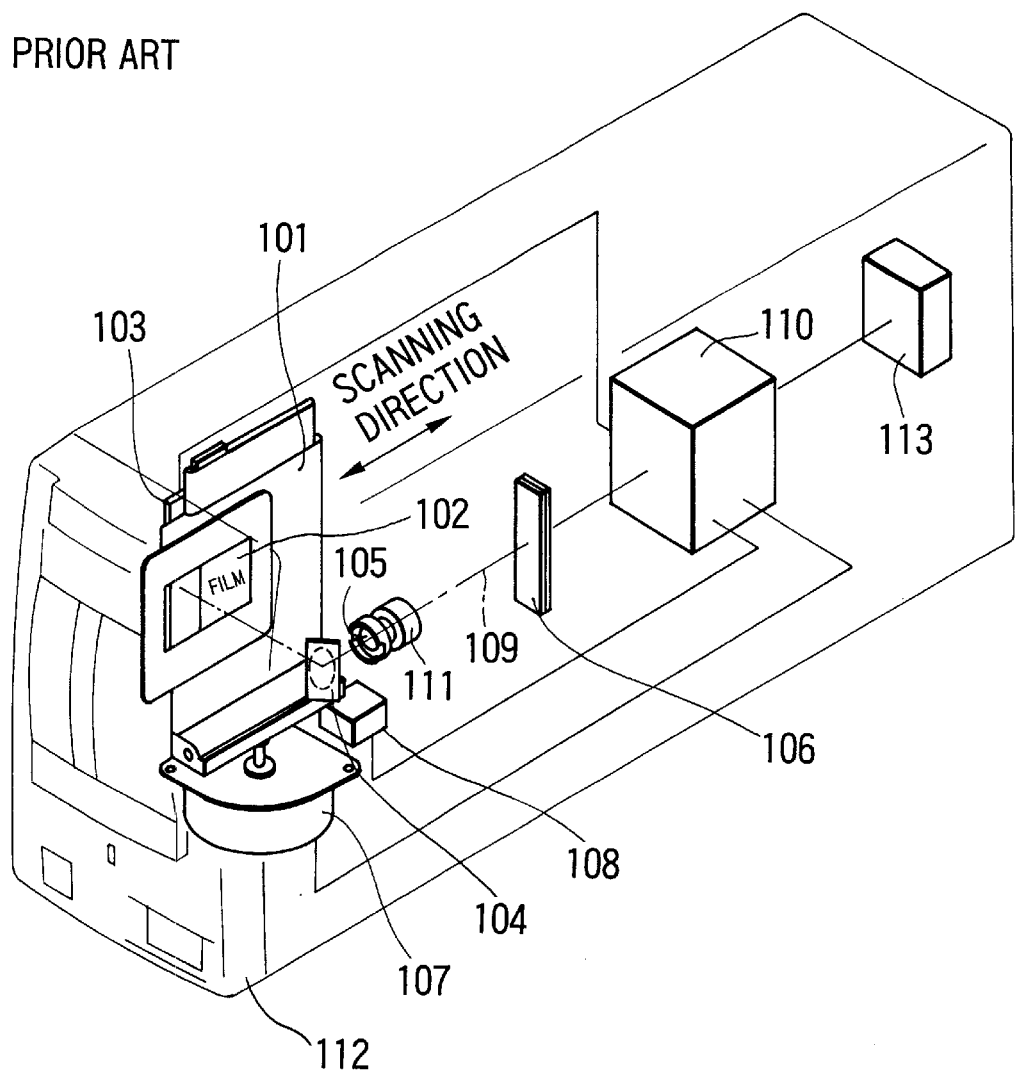
FIG. 20 is a perspective view of a conventional film scanner.
Figure 21:
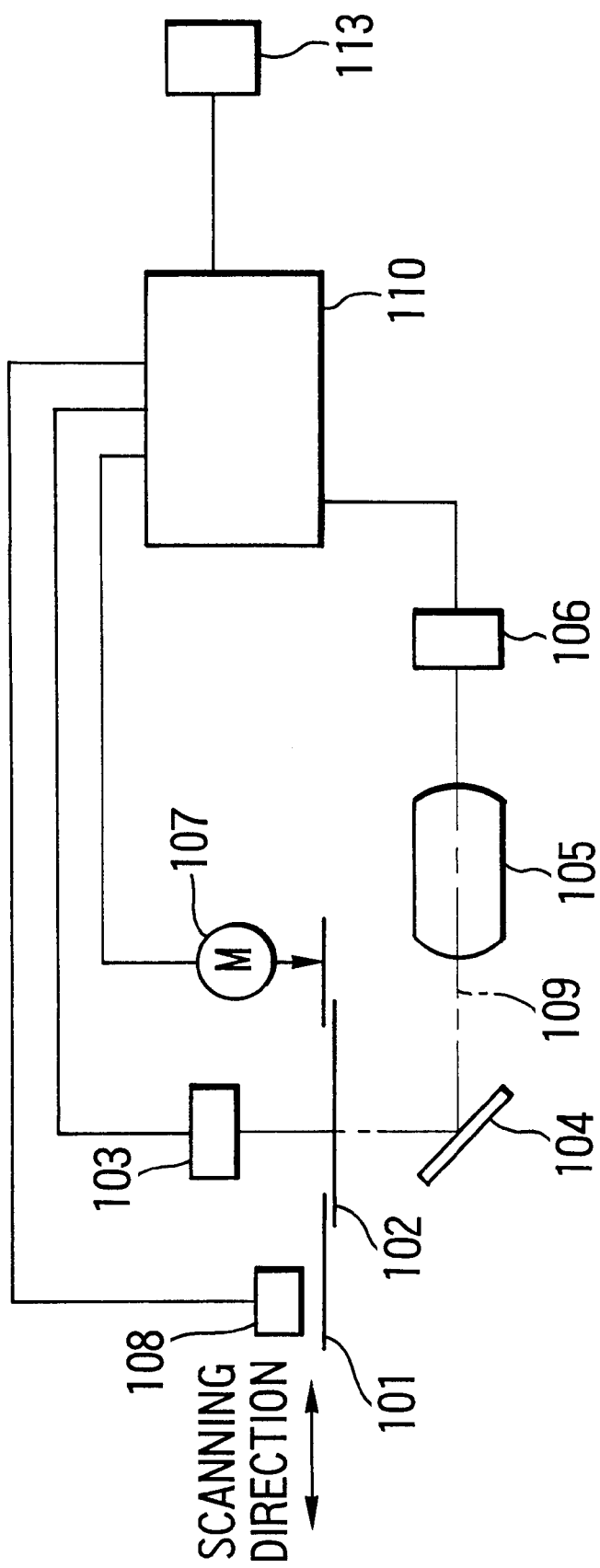
FIG. 21 is a diagram showing a schematic construction of the conventional film scanner.
Figure 22:
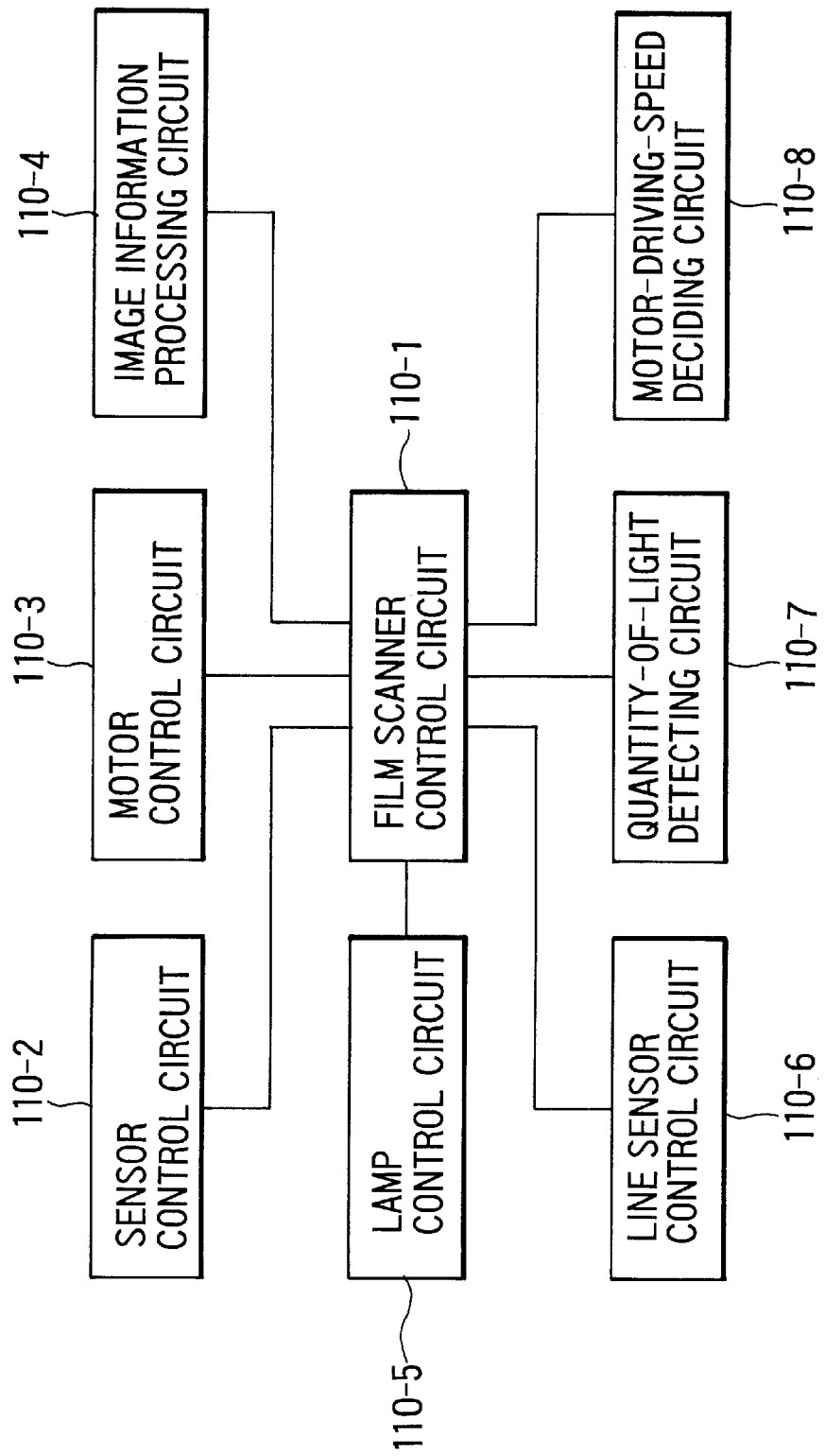
FIG. 22 is a diagram showing a circuit structure of the conventional film scanner.
Figure 23:
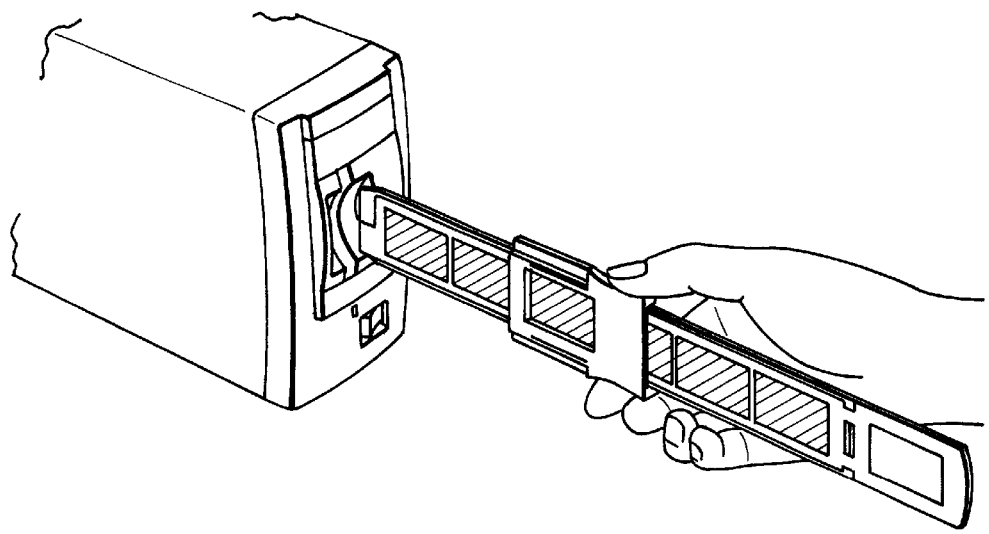
FIG. 23 is a diagram showing a manner where a sleeved film is being inserted into the conventional film scanner.
Figure 24:
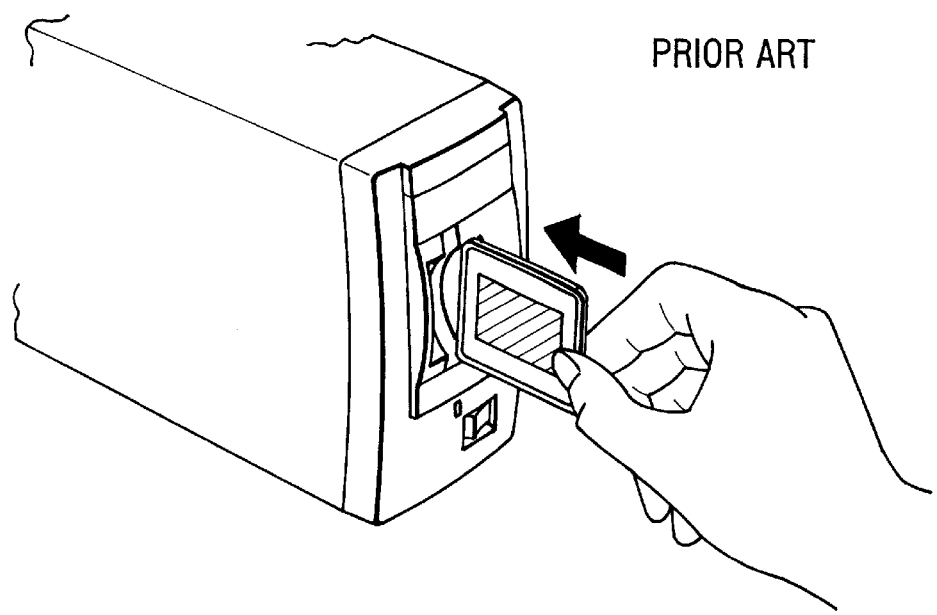
FIG. 24 is a diagram showing a manner where a slide-mounted film is being inserted into the conventional film scanner.

FIG. 19 is a perspective view showing a film scanner according to a sixth embodiment of the present invention. In FIG. 19, reference numeral 251 denotes a film scanner body, reference numeral 252 denotes a front cover, and reference numeral 253 denotes a sliding door for changing the size of a film inserting gate. In the state shown in FIG. 19, a first film inserting gate 253a is formed at a first position where the door 253 is fully opened. In this state, a cartridge film adapter can be inserted. Reference numeral 253b denotes a state of the door 253 being pulled up to a second position, and reference numeral 254 denotes a second film inserting gate. Furthermore, if the door 253 is slid to the upper end as shown by reference numeral 253c, the second film-inserting gate 254 is fully shut, and hence it is possible to prevent dust from invading.

It becomes possible for the door 253 not to accidentally move during image reading by providing click means respectively at three slide positions. In addition, it becomes more convenient to provide interlock means of turning off a power switch when the door 253 is fully closed.

As described above, according to the third to sixth embodiments, it is possible to prevent the performance of an internal optical system and a light source from degrading and to assure the quality of an original image that is read, by preventing foreign particles such as dust from invading from a film inserting slot of a film scanner, which was a problem up to now. In addition, there is an effect that, even if a film has been kept in a film scanner for a long time, it is possible to prevent a film from being polluted, by closing a lid. Furthermore, a convex lens provided in the lid can be used as a magnifying glass for inspecting a scratch and an image of a film before reading.

What is claimed is:

1. An image reading apparatus capable of reading a plurality of film originals having respective different formats, said apparatus comprising:

(a) a first film loading slot arranged on the predetermined surface of said image reading apparatus for inserting therein a first format film original;

(b) a first cover for covering said first film loading slot, wherein said first cover has a second film loading slot for inserting therein a second format film original; and (c) a second cover for covering said second film loading slot.

2. An image reading apparatus according to claim 1, wherein said second cover is detachable.

3. An image reading apparatus according to claim 2, wherein said second cover is made from a transparent or semitransparent member.

4. An image reading apparatus according to claim 2, further comprising attachments means for making said second cover detachable.

5. An image reading apparatus according to claim 3, further comprising attaching means for making said second cover detachable.

6. An image reading apparatus according to claim 1, wherein said second cover is able to be opened and closed with a hinge.

7. An image reading apparatus according to claim 6, wherein said second cover is made from a transparent or semitransparent member.

8. An image reading apparatus according to claim 1, wherein said second cover is able to be opened and closed in sliding motion.

9. An image reading apparatus according to claim 8, wherein said second cover is made from a transparent or semitransparent member.

10. An apparatus according to claim 1, further comprising image reading apparatus means for reading image on the film original.

11. An apparatus according to claim 10, further comprising moving means for moving the film original.

* * * * *